United States Patent [19]

Russell

[11] Patent Number: 4,644,355

[45] Date of Patent: Feb. 17, 1987

[54] DISPLACEMENT MEASUREMENT DEVICES

[75] Inventor: Alexander Russell, Glasgow, Scotland

[73] Assignee: Sacol Powerline Limited, Totton, England

[21] Appl. No.: 668,749

[22] Filed: Nov. 6, 1984

[30] Foreign Application Priority Data

Nov. 11, 1983 [GB] United Kingdom ............... 8330211
May 21, 1984 [GB] United Kingdom ............... 8412937
Jul. 23, 1984 [GB] United Kingdom ............... 8418742

[51] Int. Cl.$^4$ .......................................... G08C 19/08
[52] U.S. Cl. ............................ 340/870.36; 251/129.01
[58] Field of Search ...................... 340/870.32, 870.35, 340/870.36; 336/75, 30, 77, 115, 170; 251/129.01

[56] References Cited

U.S. PATENT DOCUMENTS 3,183,496 5/1965 Goldstein ...................... 340/870.32
3,812,481 5/1974 Stedtnitz .
4,080,592 3/1978 Zabler ........................... 340/870.35

FOREIGN PATENT DOCUMENTS

2423230 11/1975 Fed. Rep. of Germany .
2089515 6/1982 United Kingdom .

Primary Examiner—Jerry W. Myracle
Attorney, Agent, or Firm—Christensen, O'Connor, Johnson & Kindness

[57] ABSTRACT

A displacement transducer operable to measure relative displacement between two parts. The transducer comprises a shorted turn induction coil arrangement on one of the parts and, on the other part, a coaxial assembly of two drive coils separated by an output induction coil comprising two coils in quadrature, the drive coils and the output induction coil being inductively linked with the shorted turn arrangement which may be two or more shorted coils end to end. The transducer is suitable for measuring displacement of a piston rod relative to its cylinder. The stroke and the bearing support of the piston rod may be such that either drive coil can project beyond the adjacent end of the intermediate induction coil arrangement at either end of the stroke. The consequent changing impedance of the drive coils can be used to set a datum for displacement measurement and/or control an electrically modulated control valve which controls operation of the cylinder. Cushioning of the piston rod at either end of its stroke and automatic continuous reciprocation of the piston within the cylinder can be provided as a result.

17 Claims, 14 Drawing Figures

DISPLACEMENT MEASUREMENT DEVICES

DESCRIPTION

This invention relates to displacement measurement devices which are operable to measure relative displacement between two parts.

GB-A No. 2089515 discloses a displacement measurement device which incorporates a transformer arrangement comprising primary and secondary members which are generally of cylindrical configuration, which are arranged mutually substantially coaxially and which are mutually relatively shiftable axially and/or rotationally. The transformer members each carry an electrical conductor or conductors wound to form an open helical configuration. One member is long relative to the other member. If an alternating current is caused to flow in one member, a secondary current is induced in the other member.

Characteristics of the secondary current will depend upon the electromagnetic coupling between the members. Such coupling will vary periodically as one member shifts axially or rotationally relative to the other member, because of the open helical configuration of the electrical conductors. This periodic variation is measurable to give displacement data. Thus the device is at least capable of "coarse" measurements depending upon the axial pitches used for the primary and secondary conductors, and the resolution obtainable in dividing the periodic output signals electrically whether by analogue or digital techniques. Incorporation of such a displacement measurement device in a hydraulic ram is disclosed. The transformer primary conductor is wound on the piston rod, which is the long transformer member, and comprises a single helix, the opposite ends of which are short circuited. The transformer secondary member is the ram cylinder and it carries an axially spaced pair of secondary windings which are in spatial quadrature, thus producing an effective phase difference of 90°. A primary winding is carried by the cylinder between the secondary windings with which it is coaxial. The ends of the primary winding are connected to terminals which are an input for an alternating current signal. Primary current flow through the primary conductor on the piston rod is induced by alternating current flow through the primary winding on the cylinder, and in turn induces current flow through the two secondary windings on the cylinder from which two outputs are provided at respective output terminals. A measurement of displacement of the piston rod relative to the ram cylinder is derived from the two outputs which are sine and cosine signals.

Since the length of the primary conductor on the piston rod is substantially equal to the stroke of the hydrualic ram, which it has to be to provide a measure of piston rod displacement over the whole of the stroke of the ram, the inductance of the primary conductor increases as the stroke of the hydraulic ram is increased. Consequently the power required to induce circulation of current of the required magnitude through the primary conductor increases as the stroke of the hydraulic ram is increased and is liable to be undesirably high for long stroke applications.

DE-A No. 2423230 discloses a device which requires connections to a winding on each of two relatively movable parts. Such an arrangement is not suitable for devices such as a hydraulic cylinder. U.S. Pat. No. 3,812,481 discloses a rotary device and does not offer any solution to problems which arise in long linear devices.

An object of this invention is to provide a displacement measurement device which is operable to measure relative displacement between two parts and which is readily adaptable to a wide range of strokes of relative movement betwen two parts but which does not have an undesirably high power requirement for long stroke applications.

According to one aspect of this invention there is provided a displacement measurement device which is operable to measure relative displacement between two parts, the device comprising a pair of electrically similar drive coils and an output induction coil arrangement for mounting on one of the two parts, the drive coils and the output induction coil arrangement being substantially coaxial with the latter being located between the two drive coils which are spaced apart axially, and an intermediate induction coil arrangement for mounting on the other of the two parts substantially coaxially with the drive coils and the output induction coil arrangement mounted on said one part, the ends of the intermediate induction coil arrangement being short circuited, the device being arranged such that, in operation of it, the two drive coils are energised simultaneously by an applied alternating current signal so that alternating current flow is induced through the intermediate induction coil arrangement and through the output induction coil arrangement by the applied alternating current flow through the drive coils and by the induced current flow through the intermediate induction coil arrangement respectively, the current flow induced through the output induction coil arrangement serving as an output signal which is indicative of measured relative displacement between the two parts.

Where the stroke of relative movement between the two parts is of such a length that the power required to induce circulation of current of the required magnitude through a single shorted intermediate induction coil is undesirably high, two or more electrically similar coils arranged substantially coaxially and in line, end to end, with the opposite ends of each coil being short circuited, are provided as the intermediate induction coil arrangement, the length of each shorted coil being substantially equal to the distance between the magnetic centres of the two drive coils. Each coil of such an intermediate induction coil arrangement may be shifted angularly about its axis, relative to the remainder of the intermediate induction coil arrangement, to adjust the effective length of the intermediate induction coil arrangement. Conveniently each shorted coil of such an intermediate induction coil arrangement is incorporated in a tube of moulded plastics.

Preferably the drive coils are wound on respective ferrite cores. Such drive coils, together with the output induction coil arrangement, may be located within a space around which the turns of the intermediate induction coil arrangement are wound. The output induction coil arrangement may comprise two or more helical windings. Conveniently it may comprise two such windings in quadrature and those windings may be formed by a four start coil having alternate pairs of the ends thereof at one end joined together. The pitch of the intermediate induction coil arrangement may be the same as that of the output induction coil arrangement or the pitch of the two induction coil arrangements may be different and arranged to function in the manner of a vernier. Provision may be made for adjustment of the location of the output induction coil arrangement between the two drive coils in an axial direction.

Means responsive to movement of one of the parts relative to the other at a preselected relative location may be provided to establish a datum for displacement measurement.

Signal processing means may be provided for processing output signals from the output induction coil arrangement to derive an indication of displacement of one of the parts relative to the other.

Means responsive to the impedance of each drive coil may be provided and adapted to emit an output signal when certain predetermined different impedance conditions prevail for the two drive coils, the output signal being indicative of either of said parts being at one of two predetermined spaced locations relative to the other part. The said means responsive to the impedance of each drive coil may be adapted to emit a signal which distinguishes one of the two predetermined spaced locations of said one part relative to the other part from the other such location.

The output signal may be arranged to change progressively as either of the two parts approaches either of the predetermined spaced locations as an indication of that approach.

The two drive coils may be connected together in series across a source of AC power and each comprise a respective arm of a bridge circuit which is balanced when like impedance conditions prevail for both drive coils, there being a tapping between the two drive coils which provides an output signal which is indicative of the relative location between two said parts.

The displacement measurement device may include signal processing means responsive to the output signal and thereby operable to control operation of an electrically modulated control valve which automatically controls continuous reciprocation of a piston in a cylinder, the piston and cylinder comprising said two parts, the arrangement being such that approach of the piston to either end of its stroke is sensed and the piston is retarded automatically at either end of its stroke and accelerated away from either end of its stroke by operation of the control servo valve as controlled by said signal processing means.

The stroke of relative movement between said two parts may be such that either drive coil can project beyond the respective end of the intermediate induction coil arrangement at the respective end of that stroke, and means responsive to the impedance of each drive coil may be provided and adapted to emit an output signal which is proportional to the amount the respective drive coil protrudes from the intermediate induction coil arrangement when either drive coil so protrudes. Signal processing means may be provided whereby the output signal is indicative of which of the two drive coils is protruding from the intermediate induction coil arrangement. The signal processing means may be preset to trigger at a predetermined amount of protrusion of either drive coil from the intermediate induction coil arrangement.

One or more annular inserts of good electrically conducting material may be provided at either end of the intermediate induction coil arrangement as a means of varying the change in impedance of the respective drive coil as it emerges from the intermediate induction coil arrangement.

The intermediate induction coil arrangement may comprise a single coil which is sub-divided into a plurality of coil segment portions by means which shortcircuit the end turns of each segment portion of the coil. The said means which shortcircuit each segment portion of the single coil intermediae induction coil arrangement comprises a single substantially straight conductor which is electrically connected at spaced intervals to respective spaced turns of the coil.

Examples of displacement measurement devices in which this invention is embodied will now be described with reference to the accompanying drawings, of which.

Figure 1:
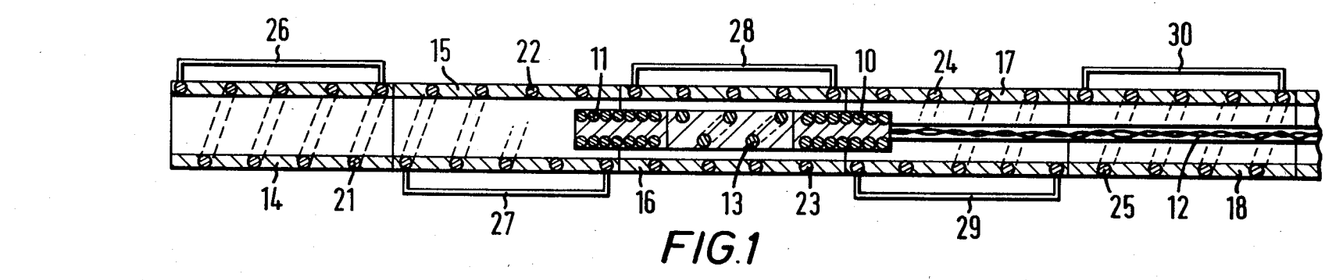
FIG. 1 is a diagram illustrating the basic arrangement of a displacement measurement device in which this invention is embodied.

FIG. 1 shows two drive coils 10 and 11 which are wound substantially coaxially on ferrite cores and which are spaced apart axially. Each end turn of each coil 10, 11 is connected to a respective power input terminal (not shown) and the pairs of leads leading from the terminals to each drive coil 10, 11 are twisted together in a known manner to form a bundle 12 of twisted leads. Twisting the pairs of leads together minimises the incidence of cross talk and induction effects and leads to substantial balancing of the system.

Figure 2:
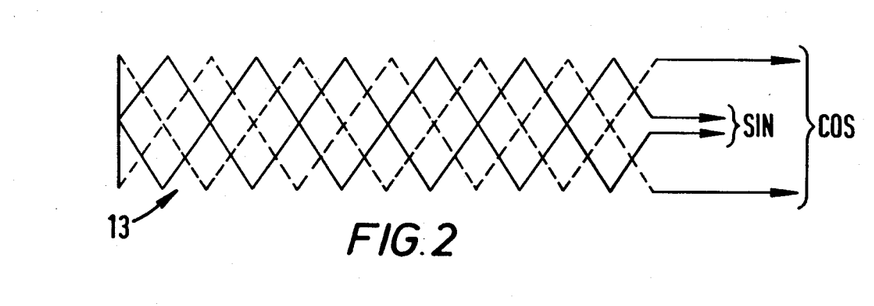
FIG. 2 is a diagram of the preferred form of output induction coil arrangement incorporated in the basic arrangement shown in FIG. 1.

An output induction coil arrangement 13 is positioned substantially coaxially between the two drive coils 10 and 11. The output induction coil arrangement 13, which is illustrated diagrammatically in FIG. 2, comprises a four start helical coil, the four open helical winding portions of which are substantially equi-angularly spaced apart from one another. Alternate ends of the four open helical winding portions of the coil arrangement 13 are joined together. The other ends of the resultant joined pairs of helical winding portions are connected to respective output terminals by respective pairs of leads (not shown) which are twisted together for the same reason as are the leads of the bundle 12. Connection of the alternate ends of the four start helical coil together leads to the coil arrangement 13 comprising two bifilar coils in quadrature, that is to say 90° out of phase with one another. Location of the output induction coil arrangement 13 between the drive coils 10 and 11 can be adjusted axially to reduce cross talk.

The assembly comprising the two drive coils 10 and 11 and the output induction coil arrangement 13 is located substantially coaxially within a cylindrical passage which is formed by a number (viz. five, shown at 14–18 in FIG. 1) of short tubular members which are arranged substantially coaxially end to end. Each tubular member comprises a tubular former of plastics material on which a respective coil 21–25 is wound. The coils 21–25 are intermediate induction coils and each of them has its end turns short circuited by a respective shunt 26–30. The intermediate induction coils 21–25, which each extend uniformly over the whole of the respective former, are electrically similar and the length of each coil 21–25 is substantially equal to the distance between the magnetic centres of the two drive coils 10 and 11. The angular orientation of any one intermediate induction coil 21–25 may be adjusted relative to that of the others by rotating the respective former about its axis whereby the effective length of the intermediate induction coil arrangement that comprises all the intermediate induction coils 21–25 is altered for calibration purposes.

In use of the device the assembly comprising the two drive coils 10 and 11 and the output induction coil arrangement 13 is mounted on one of two parts between which relative movement occurs and the intermediate induction coil arrangement formed by the line of tubular members 14–18 is mounted on the other of those two parts.

The two drive coils 10 and 11 are energised by an applied alternating current when the device is operated. Current flow through the drive coils 10 and 11 induces current flow through the adjacent intermediate induction coils 21–25, that is to say in the coils whose turns are linked with the magnetic flux generated by flow of alternating current through the turns of the drive coils 10 and 11. In practice that means two, or more usually, and as shown in FIG. 1, three of the shorted coils 21–25. The induced current flow through the one or two coils 21–25 that surround the output induction coil arrangement 13 in turn induces current flow through the induction coil arrangement 13. Thus the output induction coil arrangement 13 is electromagnetically linked with part only of the overall length of the intermediate induction coil arrangement but the part with which it is so linked in turn is always linked with an electromagnetic field which is equivalent to the output field of one of the drive coils 10 and 11.

Relative movement between the two parts causes variation in the alternating current flow through the winding portions in quadrature of the output induction coil arrangement 13. This is demodulated to produce sine and cosine output signals in the known manner and those signals can be processed in a known manner to provide an instantaneous indication of the displacement.

Provision may be made for the signal processing system to count the number of cycles of output signals generated, that number being a measure of the number of turns of the intermediate induction coil arrangement that are traversed, and to measure how much of a partly traversed turn is traversed.

Provision may be made for generation of a pilot signal which sets the signal processing system to record as a datum for displacement measurement the next instant that one of the output signal waveforms crosses the level about which that signal oscillates. The signal processing system would be arranged so that it zeroes at that recorded instant or automatically displays a predetermined preliminary displacement to which subsequently measured displacement is added.

The number of shorted intermediate induction coils provided would depend upon the length of the stroke of relative movement to be measured. In general the stroke may exceed the overall length of the intermediate induction coil arrangement by up to the length of one of the drive coils. One shorted intermediate induction coil only may suffice for short stroke applications.

The intermediate induction coil arrangement could be surrounded by the drive coils and the output induction coil arrangement rather than surround them as shown in FIG. 1.

Figure 3:
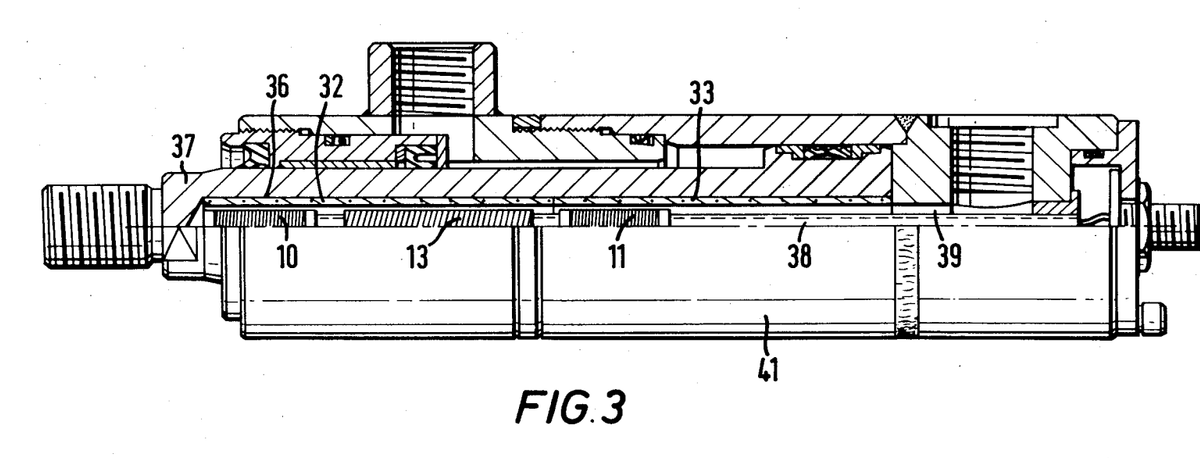
FIG. 3 is a partly sectioned elevation of a hydraulic cylinder to which the preferred form displacement measurement device in which this invention is embodied, has been fitted, the cylinder being shown fully contracted.

FIG. 3 shows the device applied to a hydraulic cylinder. There are two tubular formers 32 and 33 spigotted end to end into an axial bore 36 in the piston rod 37 of the hydraulic cylinder. The assembly of the drive coils 10 and 11 and the output induction coil arrangement 13 is mounted on a probe 38 which projects from the base of the cylinder chamber 39 of the cylinder casing 41 into the cylindrical passage formed by the line of tubular formers 32 and 33 and which incorporates the ferrite cores of the drive coils 10 and 11. The leads to the drive coils 10 and 11 and the leads from the output induction coil assembly 13, that are wound together in a bundle, are led through appropriate passages in the probe 38 to respective fluid pressure tight terminals on the cylinder casing 41.

Figures 4A, 4B:
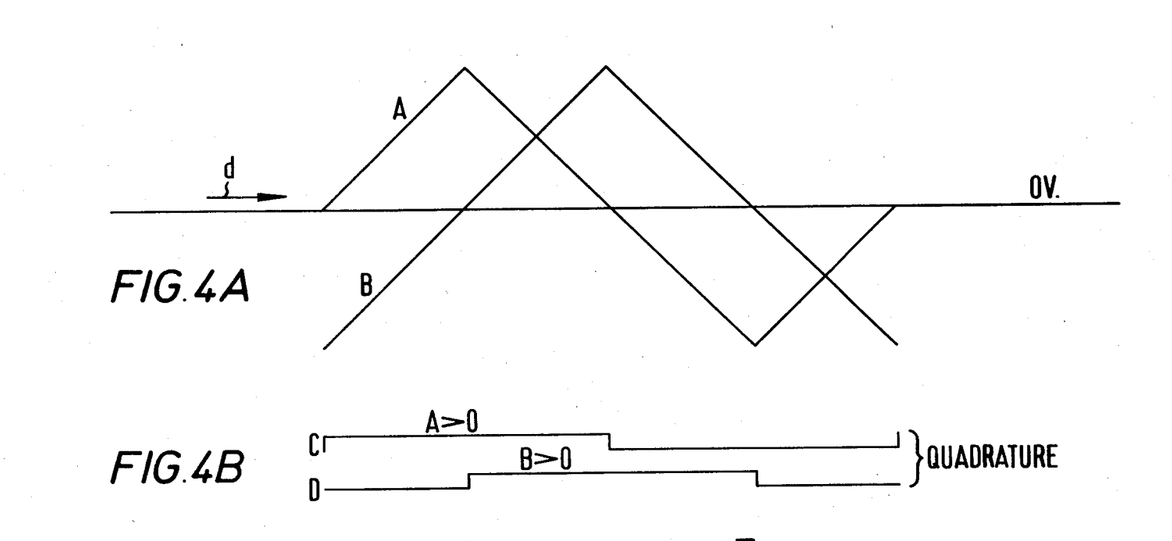
FIGS. 4A–4D comprise diagrams which illustrate operation of a signal processing system by which the output signal from the device fitted into the hydraulic cylinder shown in FIG. 1 is processed, the sine and cosine waveforms being shown as triangular waveforms for convenience.
Figure 4C:
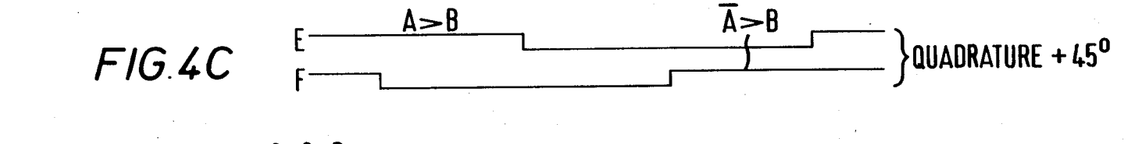
Figure 4D:
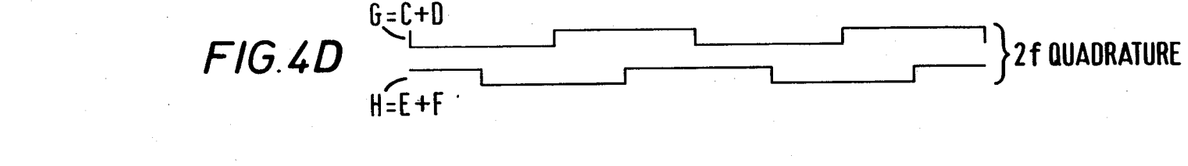

One cycle of each sine and cosine output waveform is generated as the output induction coil assembly 13 traverses one turn of one of the intermediate induction coils carried by the formers 32 and 33. A cycle of each such output waveform A, B is shown diagrammatically in FIG. 4A. FIGS. 4B–4D illustrate diagrammatically derivation of a convenient pulsed output which changes state at eight equally spaced displacement intervals during one cycle of the sine and cosine output waveforms.

Figure 5:
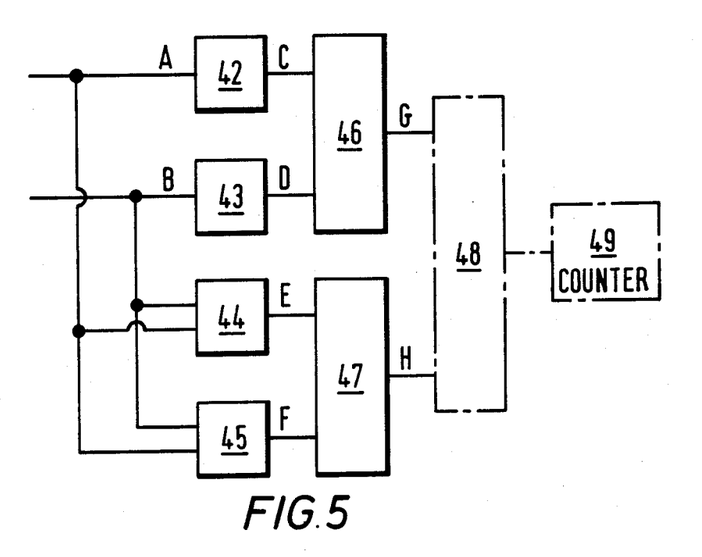
FIG. 5 is a logic circuit diagram of the signal processing system of which the operation is illustrated in FIGS. 4A–4D.

FIG. 5 shows that the signal processing means, the operation of which is illustrated by FIGS. 4A–4D, comprises first and second logic means 42 and 43 having respective outputs C and D (see FIG. 4B) and respectively responsive to the sine output waveform A and the cosine output waveform B (see FIG. 4A). The state of the output C is high whenever the sine signal A exceeds the level about which the waveforms A and B oscillate and otherwise is low. The state of the output D is high whenever the cosine signal B exceeds that level and otherwise is low. The signal processing means also comprises third and fourth logic means 44 and 45 which are responsive to both waveforms A and B and which have respective outputs E and F. The state of the output E is high whenever the sine signal A exceeds the cosine signal B and otherwise is low. The state of the output F is high whenever the inversion of the sine signal A [viz. the sine signal A(−1)] exceeds the cosine signal B and otherwise is low. Further the signal processing means includes fifth and sixth logic means 46 and 47 having respective outputs G and H. The fifth logic means 46 are responsive to the outputs C and D. The sixth logic means 47 are responsive to the outputs E and F. The state of the output G is high whenever the state of the outputs C and D is the same and otherwise is low. The state of the output 4 is high whenever the state of the outputs E and F is the same and otherwise is low. There may be means 48 responsive to the outputs G and H and adapted to emit a pulse whenever the state of either of those outputs G and H changes. A counter 49 may be provided to count the pulses.

Such a counter counts the pulses generated during movement of the piston rod 37 relative to the cylinder casing 41. The number of pulses counted is a measure of the displacement of the piston 37 relative to the cylinder casing 41. Arrangements to produce eight equally spaced pulses per cycle of the sine and cosine waveforms A and B facilitate measurement of the location of the piston 37 relative to the cylinder casing 41 when it is intermediate such a cycle, that is between the ends of a turn of the intermediate induction coil arrangement.

Figure 6:
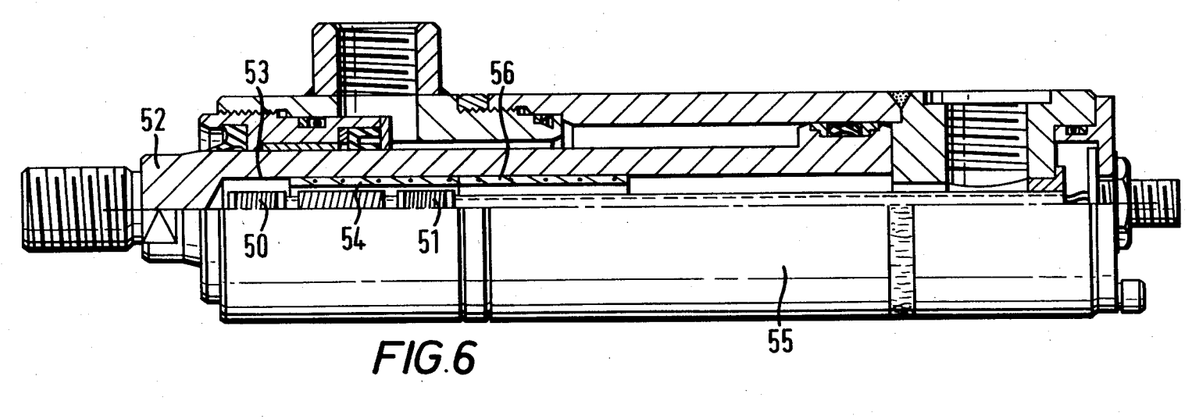
FIG. 6 is a view similar to FIG. 3 of a hydraulic cylinder which is provided with a device to establish a datum for displacement measurement.

FIG. 6 shows a hydraulic cylinder which is similar to that shown in FIG. 3 but which has been modified so that the drive coils 50 and 51 can also be used as a spaced pair of series connected coils of a device which operates in response to initiation of movement of the piston rod 52 from one end of its stroke to establish a datum for the displacement measurement.

The modifications to the hydraulic cylinder comprises extension of the closed end of the axial bore 53 in the piston rod 52 beyond the end of the adjacent tubular former 54 on which is wound one of the intermediate induction coils which have their end turns short circuited, and extension of the bearing arrangement formed by the cylinder body 55 for the piston rod 52 so as to lengthen the stroke of the piston rod 52. These modifications allow each drive coil 50, 51 to project from the respective end of the formers 54 and 56 when the cylinder is either contracted (as in FIG. 6) or extended (as in FIG. 6A).

Figure 7:
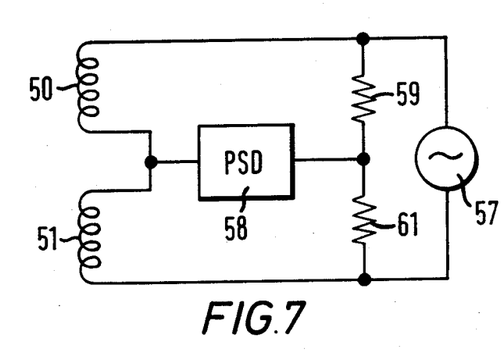
FIG. 7 is an electrical circuit diagram of the electrical circuitry of the device that is fitted to the hydraulic cylinder shown in FIG. 6 to establish a datum for displacement measurement.

The leads to the drive coils 50 and 51 are connected outside the cylinder casing 55 into an electric bridge circuit as shown in FIG. 7.

FIG. 7 shows that the two coils 50 and 51 are connected together in series across a source 57 of AC power, which, conveniently, is an oscillator. A centre tapping between the two coils 50 and 51 is connected to one terminal of a phase sensitive detector 58 which is balanced when both coils 50 and 51 are within the cylindrical passage formed by the formers 54 and 56 so that the same current flows through those coils 50 and 51 in that condition. Two substantially equal resistors 59 and 61 are connected in series across the power source 57 in parallel with the coils 50 and 51. A centre tapping between the two resistors 59 and 61 is connected to another terminal of the phase sensitive detector 58.

The output from the phase sensitive detector 58 will be zero if the impedance of the two coils 50 and 51 are equal as both inputs to the detector 58 are equal. However, if the coil impedances become unequal, a positive or negative output will appear at the output of the phase sensitive detector 58 and the sense of that output will depend upon the state of the impedance of the coils 50 and 51. The impedance of either coil 50, 51 will be high (HI) when that coil 50, 51 is outside the cylindrical passage formed by the formers 54 and 56. When either coil 50, 51 is within the cylindrical passage formed by the formers 54 and 56, a load is placed upon that coil 50, 51 due to the action of the surrounding shorted turns coil, so that the impedance of that coil 50, 51 becomes low (LO).

Figure 6A:
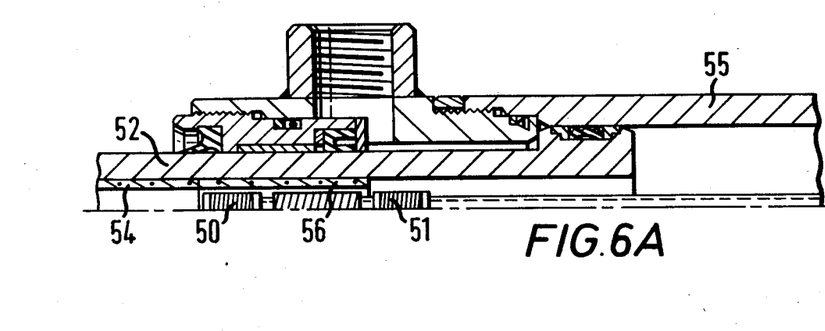
FIG. 6A is a sectioned fragment of the hydraulic cylinder shown in FIG. 6 in its fully extended condition.

In use of the apparatus shown in FIGS. 6, 6A and 7, when either drive coil 50, 51 emerges from the respective end of the tubular formers 54 and 54, an out of balance signal is emitted by the phase sensitive detector 58. This signal is linearly proportional to the amount the respective drive coil 50, 51 protrudes and is indicative of which of the two coils 50 and 51 is protruding. The phase sensitive detector 58 may be preset to trigger at a desired moment of protrusion so as to suit characteristics of the intermediate induction coils on the formers 54 and 56.

Figure 8:
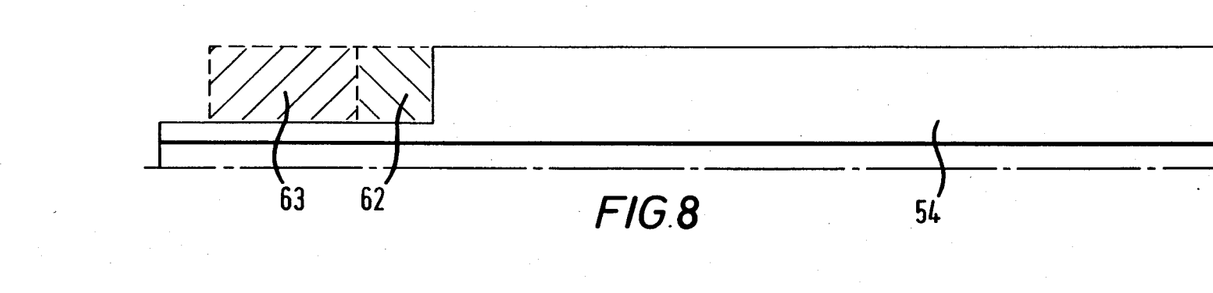
FIG. 8 is a diagram which illustrates a modification of the hydraulic cylinder shown in FIG. 6.

The relative change of state of the impedance of either drive coil 50, 51 as it emerges from the bores of the tubular formers 54 and 56 at either end thereof can be varied to suit requirements by the use of one or more annular inserts of good electrically conducting material (such as aluminium or copper) at the respective end of the respective former 54, 56; for example as shown at 62 and 63 at one end of the former 54 in FIG. 8. In the absence of such an insert 62, 63, the impedance of a drive coil 50, 51 changes progressively between its high and low limits as the respective coil 50, 51 traverses the end of the respective intermediate induction coil wound on the formers 54 and 56. Use of an annular insert 62 of good electrically conducting material, which has an axial length substantially equal to the difference between the length of either drive coil 50, 51 and the distance between the end of the axial bore 53 and an adjacent end of an intermediate induction coil, ensures that the impedance of the drive coil 50, 51 does not rise to its high until it reaches the end of its stroke where it has fully emerged from within the respective former 54, 56. Provision of another annular insert 63 further delays increase in the impedance of the emerging drive coil 50, 51, it being desirable to arrange that the output of the phase sensitive detector 58 triggers earlier and at a lower impedance because the drive coil 50, 51 would be only partly emerged from the respective former 54, 56 when it reaches the respective end of its stroke.

Use of material having a conductivity intermediate that of ferro magnetic material such as steel and that of a good electrically conductive material such as copper would further contribute towards the change of state of the impedance of the drive coil 50, 51 being progressive as it emerges from the intermediate induction coils.

Such a progressively increasing impedance of the drive coil 50, 51 as it approaches the respective end of the stroke of the piston 52 can be used as an indication of approach of the end of the stroke of the piston 52 and can be arranged to trigger means operative to effect end of stroke cushioning to minimize impact forces at the end of the stroke. To this end the signal processing system may incorporate electronic circuitry for processing the output of the phase sensitive detector 58 which is connected in the bridge circuit shown in FIG. 7, and for deriving from it a control signal for controlling an electrically modulated control valve which controls flow to the cylinder to effect extension or contraction of the cylinder.

Figure 9:
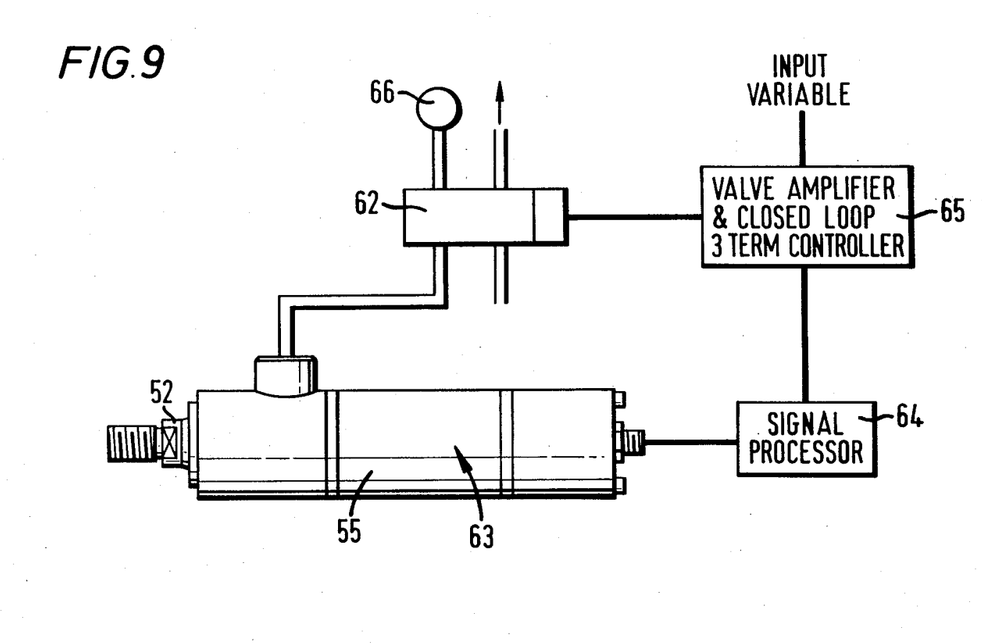
FIG. 9 is a diagram of an electrohydraulic control system for the cylinder shown in FIGS. 6 and 6A.

FIG. 9 shows such an electrically modulated control valve 62 having two ports each connected to a respective one of the two ports of the hydraulic cylinder 63 which is as shown in FIGS. 6 and 6A. The valve 62 is operable under the control of a signal processor 64 via a valve amplifier and closed loop 3 term controller 65 to selectively connect one of the ports of the cylinder 63 to a source 66 of fluid under pressure and to connect the other port of the cylinder 63 to a reservoir. The output leads from the output induction coil assembly are connected to an input of the signal processor 64.

In addition to sensing movement of the piston rod 52 relative to the cylinder casing 55 and generating signals to effect energisation or de-energization of the winding of the control valve 62 at either end of the stroke of the piston rod 52, the electronic circuitry may operate to control continuous reciprocating movement of the piston rod 52 within the cylinder casing 55 automatically. Basically changes in the impedance of either coil 50, 51, which occur with a slope consequent upon the emergence of that coil 50, 51 from within the respective former 54, 56 lead to the magnitude of the signal that energises the winding of the control valve 62, being reduced with a similar slope. There is a consequent increasing restriction in the supply of hydraulic fluid to drive the piston rod 52 in the direction in which it is being driven by operation of the control valve 62. Hence movement of the piston rod 52 is retarded until it reaches a preselected position adjacent the end of its stroke at which the cylinder 63 is fully extended or contracted. The hydraulic connections of the control valve 62 are then switched automatically so that the piston rod 52 is urged in the other direction.

Acceleration of the piston rod 52 follows from re-entry of the coil 50, 51 into the respective former 54, 56 and the consequent change in its impedance, and increases until both coils 50 and 51 are wholly within the tubular formers 54 and 56. Steady state conditions prevail until the other coil 50, 51 starts to emerge from the other tubular former 54, 56. The consequent progressive change in the impedance of the emerging coil 50, 51 leads to there being a similar progressive reduction in the signal that is transmitted to the control valve 62 so that movement of the piston rod 52 is retarded. That situation continues until the piston rod 52 reaches a position relative to the other end of its stroke at which the hydraulic connections are switched again and the process repeated.

Thus the device described with reference to FIGS. 6, 6A, 7 and 9 can operate to sense approach of the piston rod 52 to either end of its stroke, to automatically retard the piston rod 52 at either end of its stroke and accelerate the piston rod 52 away from either end of its stroke during continuous reciprocation of the piston rod 52.

It has proved difficult to accurately assemble an induction coil arrangement which, as is described above with reference to FIGS. 1, 3, 6 and 6A, comprises two or more discrete, electrically similar coils arranged substantially coaxially and in line, end to end, with the opposite ends of each coil being short circuited.

Figure 10:
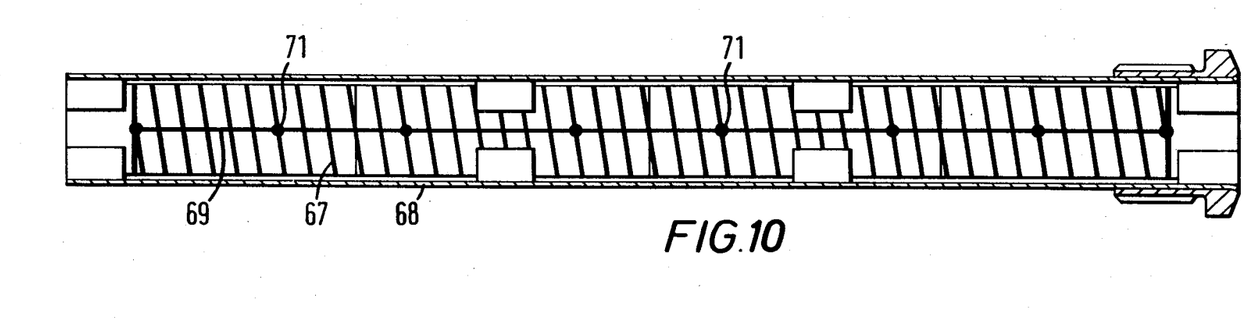
FIG. 10 is a longitudinal section of a modified form of intermediate induction coil arrangement for incorporation in a hydraulic cylinder as shown in either FIG. 3 or FIG. 6.

FIG. 10 shows an induction coil arrangement which is suitable for use in place of the induction coil arrangement of the hydraulic cylinder shown in FIG. 3, FIG. 6 or in FIG. 6A, and which is simpler to construct in production. It comprises a coil 67 wound on a tubular former 68 of electrically insulating material, such as a plastic molding. A single straight length 69 of wire is soldered to spaced turns of the coil 67, as at 71, whereby to divide the coil 67 into interconnected coil segments which each has its end turns short circuited by a length of wire. The distance between adjacent soldered joints 71 should be substantially equal to the distance between the magnetic centers of the associated drive coils as described above.

The portions of the wire length 69 between the soldered joints 71 are insulated.

I claim:

1. A displacement measurement device which is operable to measure relative displacement between two parts, the device comprising a pair of electrically similar drive coils and an output induction coil arrangement for mounting on one of the two parts, the drive coils and the output induction coil arrangement being substantially coaxial with the latter being located between the two drive coils which are spaced apart axially, and an intermediate induction coil arrangement for mounting on the other of the two parts substantially coaxially with the drive coils and the output induction coil arrangement mounted on said one part, the ends of the intermediate induction coil arrangement being short circuited, the device being arranged such that, in operation of it, the two drive coils are energized simultaneously by an applied alternating current signal so that alternating current flow is induced through the intermediate induction coil arrangement and through the output induction coil arrangement by the applied alternating current flow through the drive coils and by the induced current flow through the intermediate induction coil arrangement respectively, the current flow induced through the output induction coil arrangement serving as an output signal which is indicative of measured relative displacement between the two parts.

2. A displacement measurement device according to claim 1, in which the intermediate induction coil arrangement comprises at least two electrically similar coils which are arranged substantially coaxially and in line, end to end, with the end turns of each coil being short circuited, the length of each shorted turns coil being substantially equal to the distance between the magnetic centers of the two drive coils 3. A displacement measurement device according to claim 2, wherein each shorted turns coil is shiftable angularly about its axis, relative to the remainder of the intermediate induction coil arrangement, to adjust the effective length of the intermediate induction coil arrangement.

4. A displacement measurement device according to claim 1, wherein the drive coils, together with the output induction coil arrangement, are located within a space around which the turns of the intermediate induction coil arrangement are wound.

5. A displacement measurement device according to claim 1, wherein the output induction coil arrangement comprises two helical windings in quadrature.

6. A displacement measurement device according to claim 1, wherein the pitch of the intermediate induction coil arrangement is the same as that of the output induction coil arrangement.

7. A displacement measurement device according to claim 2, wherein the pitch of the two induction coil arrangements is different and arranged to function in the manner of a vernier.

8. A displacement measurement device according to claim 1, wherein provision is made for adjustment of the location of the output induction coil arrangement between the two drive coils in an axial direction.

9. A displacement measurement device according to claim 1, wherein means responsive to movement of one of the parts relative to the other at a preselected relative location are provided to establish a datum for displacement measurement.

10. A displacement measurement device according to claim 9, wherein means responsive to the impedance of each drive coil are provided and are adapted to emit an output signal when certain predetermined different impedance conditions prevail for the two drive coils, the output signal being indicative of either of said parts being at one of two predetermined spaced locations relative to the other part.

11. A displacement measurement device according to claim 10, wherein said means responsive to the impedance of each drive coil are adapted to emit a signal which distinguishes one of the two predetermined spaced locations of said one part relative to the other part from the other such location.

12. A displacement measurement device according to claim 10, wherein the output signal is arranged to change progressively as either of the two parts approaches either of the predetermined spaced locations as an indication of that approach.

13. A displacement measurement device according to claim 1 and including signal processing means responsive to the output signal and thereby operable to control operation of an electrically modulated control valve which automatically controls continuous reciprocation of a piston in a cylinder, the piston and cylinder comprising said two parts, the arrangement being such that approach of the piston to either end of its stroke is sensed and the piston is retarded automatically at either end of its stroke and accelerated away from either end of its stroke by operation of the control valve as controlled by said signal processing means.

14. A displacement measurement device according to claim 1, wherein the stroke of relative movement between said two parts is such that either drive coil can project beyond the respective end of the intermediate induction coil arrangement at the respective end of that stroke, and means responsive to the impedance of each drive coil are provided and are adapted to emit an output signal which is proportional to the amount the respective drive coil protrudes from the intermediate induction coil arrangement when either drive coil so protrudes.

15. A displacement measurement device according to claim 14, wherein the signal processing means are preset to trigger at a predetermined amount of protrusion of either drive coil from the intermediate induction coil arrangement.

16. A displacement measurement device according to claim 1, wherein the intermediate induction coil arrangement comprises a single coil which is sub-divided into a plurality of coil segment portions by means which shortcircuit the end turns of each segment portion of the coil.

17. A displacement measurement device according to claim 16, wherein said means which shortcircuit each segment portion of the single coil intermediate induction coil arrangement comprises a single substantially straight conductor which is electrically connected at spaced intervals to respective spaced turns of the coil.

* * * * *